Patented May 10, 1932

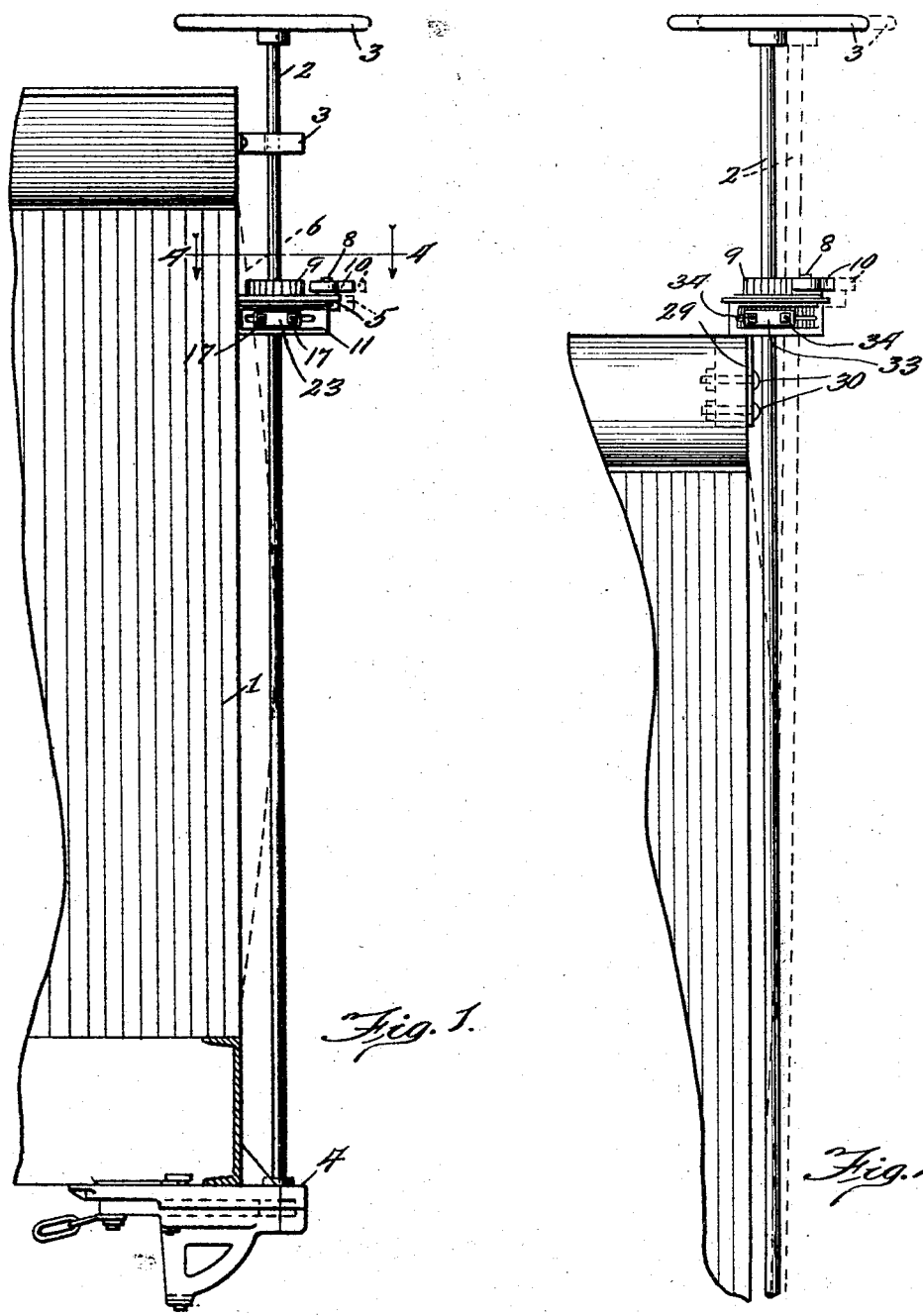

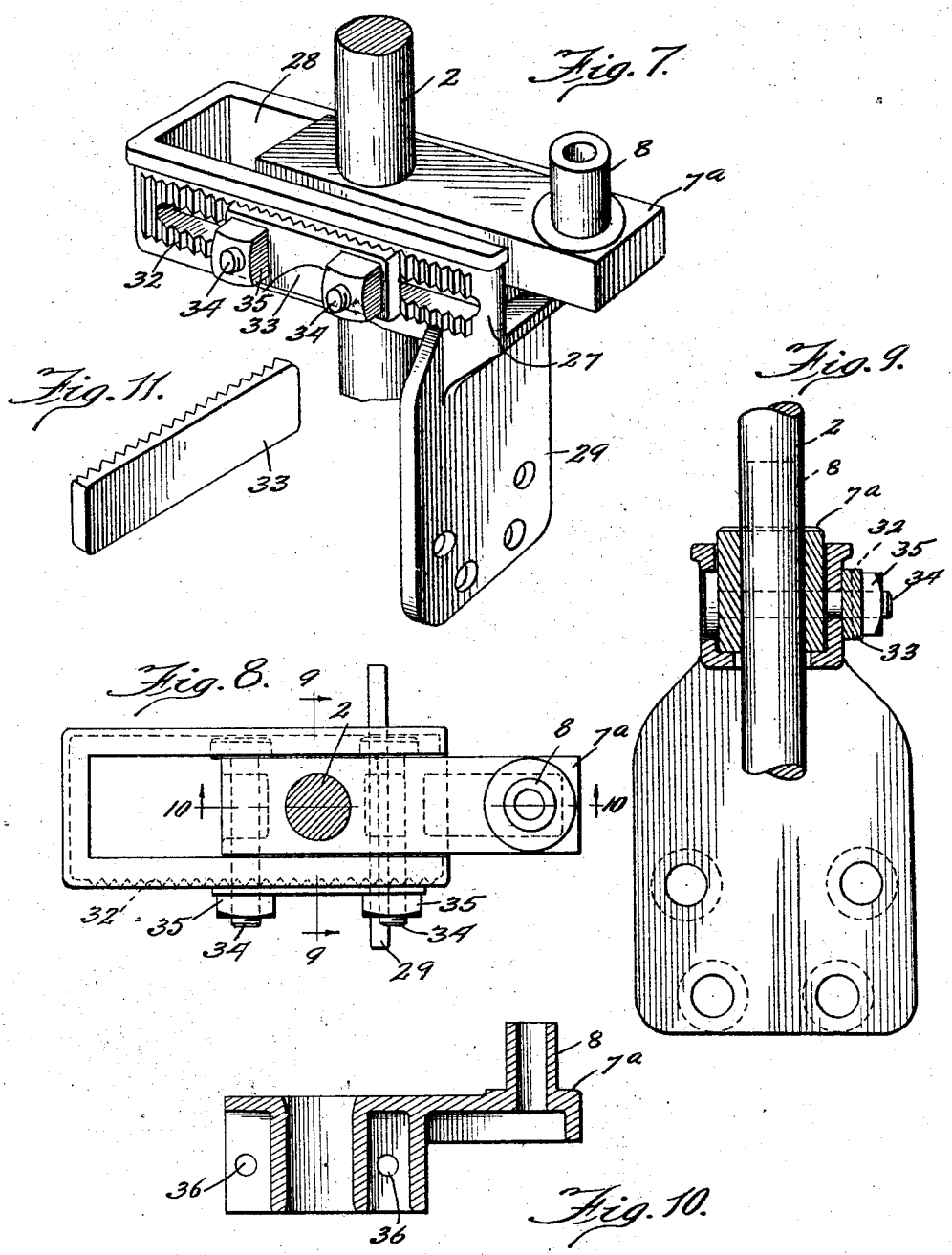

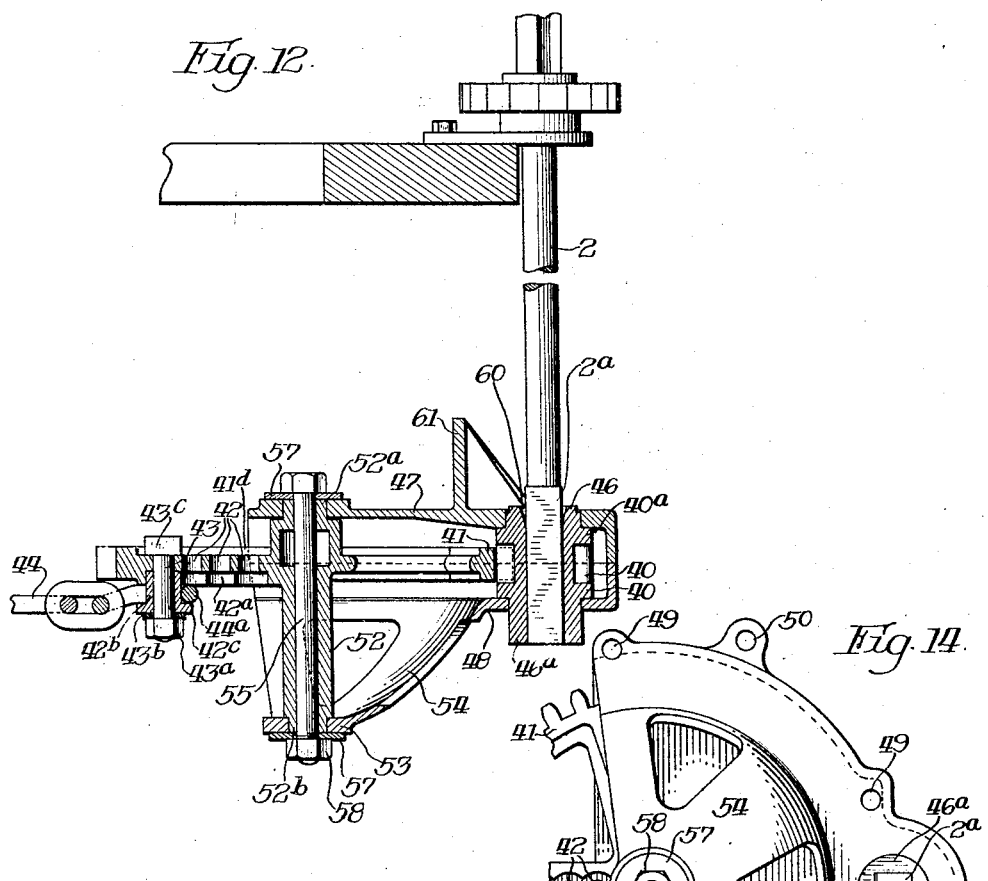

1,858,188

UNITED STATES PATENT OFFICE

THOMAS K. CUMMINS, OF ST. PAUL, MINNESOTA, ASSIGNOR TO NORTHERN MALLEABLE IRON COMPANY, OF ST. PAUL, MINNESOTA, A CORPORATION OF MINNESOTA

HAND BRAKE MECHANISM

Application filed April 11, 1928. Serial No. 269,145.

My invention relates to hand brake mechanisms and particularly such as are used upon railroad freight cars.

One of the objects of the invention is to provide a simple, practical and advantageous hand brake mechanism.

Another object of the invention is to prevent bulging or expansion of the rear wall of a freight car to which the hand brake staff or rod is connected, from interfering with the proper operation of the hand brake mechanism.

Another object of the invention is to provide an effective and advantageous arrangement for increasing the power of the brakes by the use of the hand brake mechanism.

In the accompanying drawings:

Fig. 1 is a side elevation of an end portion of a freight car and hand brake mechanism embodying my invention applied thereto;

Fig. 2 is a similar view of a modified arrangement;

Fig. 7 is a perspective view of a portion of the hand brake mechanism shown in Fig. 2;

Fig. 8 is a horizontal sectional view of the same;

Fig. 9 is a cross section taken on line 9—9 in Fig. 8;

Fig. 10 is a cross section taken on line 10—10 in Fig. 8;

Fig. 11 is a perspective view of a detail of construction;

Fig. 12 is a view partly in elevation and partly in vertical section of the bottom portion of the mechanism, said Fig. 12 being taken on line 12—12 in Fig. 13;

Fig. 13 is a horizontal section taken on line 13—13 in Fig. 12; and

Fig. 14 is a bottom view looking up at the underside of the mechanism of Fig. 12.

Figure 3:
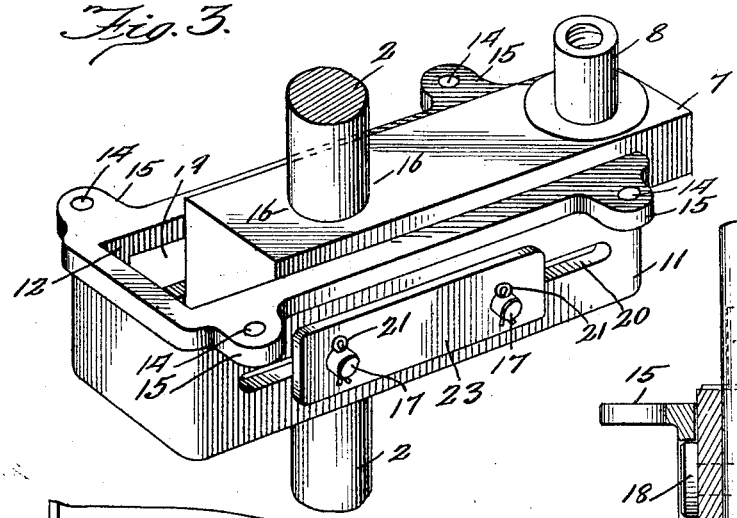
Fig. 3 is a perspective view of a portion of the hand brake mechanism shown in Fig. 1.
Figure 5:
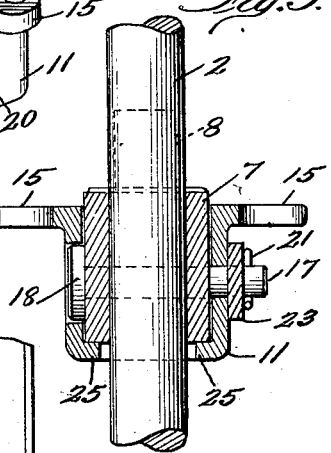
Fig. 5 is a cross section taken on line 5—5 in Fig. 4.

Referring to Fig. 1, I show the end 1 of a freight car to which the hand brake mechanism may be applied.

The hand brake mechanism shown involves a vertically arranged staff or brake-rod 2, having a hand wheel 3 at its upper end and arranged at the rear end 1 of the freight car. Near its upper end the rod 2 may be held in position by a bracket or bearing 3 and near its lower end by a bracket arrangement 4. A step or platform 5 is shown also near the upper end of the rod 2 but below the bracket 3.

When freight cars are heavily loaded they are apt to bulge at the end, as shown by curved line 6 indicating in an exaggerated way the manner in which the freight car end may bulge out. This would naturally cause trouble with the hand brake mechanism at the end of the car, unless provision was made to prevent it. In accordance with my invention I arrange to prevent this trouble or injury.

In accordance with the structure shown in this Fig. 1 for carrying out the invention, I arrange for adjustment or relative shifting movement between the brake-rod or staff 2 and the step or platform 5, so that when the car end bulges out the step or platform may move outwardly while the brake-rod or staff remains stationary, or substantially so, and thus the rod or staff is relieved of strain which would tend to bend it so as to cause appreciable loss in braking power or to render brakes entirely inoperative.

Figure 4:
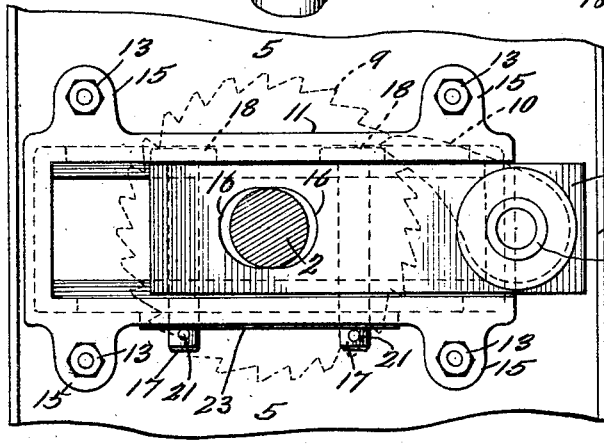
Fig. 4 is a cross section taken on line 4—4 in Fig. 1.
Figure 6:
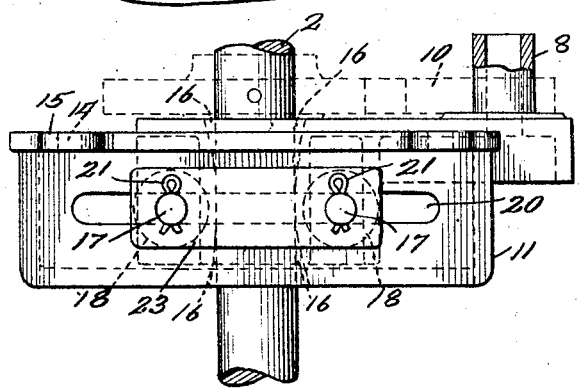
Fig. 6 is a side elevation of the mechanism shown in Fig. 3.

To such end I show a brake-rod bearing 7 through which the brake-rod 2 is adapted to pass, as indicated in Fig. 3. The bearing has an aperture to accommodate the brake-rod 2. It also has an upwardly extending member or projection 8 which is to accommodate and serve as the pivot or axis for a pawl which is to cooperate with a ratchet wheel on the brake-rod. Such a ratchet wheel 9 and pawl 10 are shown in dotted lines in Fig. 4, the ratchet being understood to be keyed or otherwise secured to the brake-rod. Thus, the member 7 serves not only as a bearing for the brake-rod, but also as a holder or carrier for the ratchet and pawl for controlling the winding and unwinding rotary movements of the brake-rod.

I also show a box or holder 11 for the bearing and carrier 7, this box 11 having a longitudinally extending recess 12 in which the member 7 may fit and slide. The box 11 is understood to be firmly secured to the step or platform 5, as by screws or bolts 13, 13 passed through apertures 14 in said projections 15 on said box 11. Thus a relative movement is permitted between the member 7 and box or holder 11 and consequently when the car end bulges out, as shown for example in Fig. 1, the box 11 may move relatively to the member 7 and hence the strain and force that would be exerted upon the brake-rod 2 is not so exerted and the brake-rod is permitted to remain in the position it would naturally assume which would be more or less vertical.

In order to permit a certan amount of play or rocking movement on the part of brake-rod 2 relatively to member 7, in case there should be some movement or bending of the brake-rod 2, the aperture in member 7 through which the brake-rod extends is preferably made with side recesses 16, 16 at the top and bottom of the brake-rod aperture, said recesses tapering toward the middle of the member 7.

To hold the member 7 in its proper position while at the same time permitting relative movement between it and member 11, I preferably provide guiding and holding means, such for example, as the bolts 17 which pass crosswise through box 11 and member 7 and whose heads 18 preferably fit in a slot 19 in one side of box 11 while the bolts themselves fit in a slot 20 on the other side of said box 11, the bolts being provided with cotter pins 21, a plate 23 being preferably interposed between cotter pins 21 and the adjacent side of box 11. Thus the members 7 will be properly guided and held in position and the bolts 17 will be prevented from turning by having their heads in slot 19, the member 11 being also preferably provided with inwardly extending flanges 25 at its bottom edge to serve also in guiding and supporting the member 7.

In Fig. 2, I show an arrangement by which the bulging end of a freight car may be taken care of where the connection between the brake-rod and the car end is substantially at the top of the car. This arrangement is also shown in Figs. 7 to 11 inclusive.

In this arrangement a member 7ª, similar to the member 7, is provided to serve as a bearing for the brake-rod 2 and also as a pivot or axis for the pawl for the brake-rod ratchet.

A cooperating box-like member or holder 27 is shown holding this member 7ª and provided with an elongated slot or recess 28 to permit relative adjustment as between members 7ª and 27.

The member 27 is provided with a plate or bracket member 29 which is intended and adapted to be secured to the upper part of the car end, as by bolts 30, 30, Fig. 2. Thus member 7ª may be adjusted to accommodate an inclination imparted to brake-rod 2 by reason of the outward bulging of the car end, as shown in Fig. 2.

This adjustment of member 7ª may be accomplished by hand and to such end I show serrations or teeth 32 on one side of box 27 and a plate 33 having similar serrations or teeth to cooperate with the teeth 32 and bolts 34 passing through plate 33 and member 27 so as to hold plate 33 in position. Nuts 35 may be tightened so as to cause a firm grip between plate 33 and box 27. This permits the manual adjustment of the member 7ª so as to accommodate the inclination necessary to give the brake-rod 2 and then the firm tightening or clamping of plate 33 so as to hold member 7ª in position, said member 7ª being provided with apertures 36 to accommodate bolts 34 and thereby cause member 7ª to be held in position by said bolts. If the freight car has no bracket 3, the box 11 may be provided with a serrated side and plate, as shown in Figs. 7-11, instead of plate 23.

In Figs. 12, 13 and 14 I show an arrangement for increasing the power of the brake mechanism. This comprises a pinion 40 on the lower squared end 2ª of the brake rod and a gear 41 meshing with pinion 40. Gear 41 has one of its arms 41ª provided with a series of apertures 42 which are adapted to receive a bolt 43. The underside of each aperture 42, however, is enlarged as at 42ª so as to accommodate a trunnion or thimble 42ᵇ having a flange 42ᶜ at one end. The bolt 43 is provided with a nut 43ª and a lock washer 43ᵇ. An enlarged link 44ª of the brake-chain 44 may be fitted over the thimble or trunnion 42ᵇ so as to be loose thereon but so as to held in position by the pinion arm 41ª above and the flange 42ᶜ below.

The arm 41ª is preferably provided with guides 41ᶜ forming a channel 41ᵈ adapted to receive the head 43ᶜ of bolt 43 but to prevent said head 43ᵇ from turning.

Thus the bolt 43 may be passed through one of the apertures 42 and then the chain link 44ª placed over the thimble or trunnion 42ᵇ and the latter slipped up on the lower portion of bolt 43 and then washer 43ᵇ and nut 43ª applied and tightened. The result of this is that chain link 44ª will be provided with a substantial and rigid bearing sufficient to withstand the heavy pull on the chain and at the same time the bolt is largely relieved of this strain, and furthermore, the chain connection is free to turn or rotate so that the pulling strain will always be directly upon it, irrespective of the position of the gear 41.

The pinion 40 is preferably "shrouded",— that is, it has disk or plate-like members 40ª above and below the teeth so as to reenforce the top and bottom of the teeth, thereby permitting a relatively small pinion to be used for the service required. Furthermore, this shrouded arrangement protects the teeth and helps to keep the gear in proper alignment.

Pinion 40 is preferably provided with elongated hub portions 46 and 46ª which are adapted to fit in bracket members 47 and 48, respectively. These bracket members are held together by bolts 49 and 50. The gear 41 is preferably provided with an elongated hub 52 whose upper end 52ª fits in an aperture in the upper bracket 47 and whose lower end 52ᵇ fits in an aperture in the lower bracket portion 53 forming with a depending portion 54 part of the bracket 48. A bolt 55 extends through hub 52 and is held in position by washers 57 and a nut 58 on its lower end.

By this arrangement a rotation of brake-rod 2 will turn pinion 40 and cause it to turn gear 41 and this will cause chain 44 to be wrapped around hub 52 so that power is first quickly applied to the brakes and then that power is greatly increased by the winding of the chain around hub 52.

The hub 46 which receives brake-rod end 2ª preferably has the upper end of the brake-rod aperture widened or cut-away on all four sides, as shown at 60, so as to accommodate any slight inclination that may occur either in the brake-rod or in the pinion itself.

The bracket 47 has an upwardly extending shoulder or abutment 61.

It will be understood that changes and modifications may be made without departing from the spirit of the invention.

What I claim is:

1. A power increasing mechanism comprising a rotary member provided with one or more apertures, a bolt for passing through said apertures, a trunnion or thimble adapted to fit on said bolt and be held in position by the same, and a chain having a link adapted to fit loosely on said trunnion or thimble.

2. A power increasing mechanism comprising a gear provided with a series of radially arranged apertures, a bolt adapted to fit in one of said apertures, a thimble or trunnion adapted to fit over said bolt and be held in position by the same, and a brake chain having a link adapted to fit loosely on said trunnion or thimble, which latter is provided with a flange to hold said link in position while allowing the same to turn relatively to the trunnion or thimble.

3. A power increasing mechanism comprising a gear having an arm or spoke provided with a series of radial apertures and also provided with longitudinally extending side guides, the under portions of said apertures being enlarged, a bolt adapted to pass through one of said apertures and having a head adapted to fit between said guides and be held against turning by the same, a thimble or trunnion adapted to fit in one of the enlarged portions of said apertures, said thimble or trunnion having an annular flange at its outer end, a nut for the bolt adapted to hold the trunnion or thimble in position, and a brake chain having an enlarged link adapted to fit loosely over said trunnion or thimble and be held in position on the same by the annular flange thereof.

In witness whereof, I hereunto subscribe my name this 2nd day of April, A. D. 1928.

THOMAS K. CUMMINS.